US007680227B2

(12) United States Patent
Kavadias et al.

(10) Patent No.: US 7,680,227 B2
(45) Date of Patent: Mar. 16, 2010

(54) METHOD AND SYSTEM FOR FILTER CALIBRATION USING FRACTIONAL-N FREQUENCY SYNTHESIZED SIGNALS

(75) Inventors: Spyridon C. Kavadias, Voula (GR); Konstantinos D. Vavelidis, Ilioupolis (GR); Nikolaos C. Haralabidis, Athens (GR)

(73) Assignee: Broadcom Corporation, Irvine, CA (US)

( * ) Notice: Subject to any disclaimer, the term of this patent is extended or adjusted under 35 U.S.C. 154(b) by 890 days.

(21) Appl. No.: 11/431,960

(22) Filed: May 11, 2006

(65) Prior Publication Data

US 2007/0207760 A1 Sep. 6, 2007

Related U.S. Application Data

(60) Provisional application No. 60/778,232, filed on Mar. 2, 2006.

(51) Int. Cl.
*H04L 7/00* (2006.01)
(52) U.S. Cl. ...................................... 375/354; 375/376
(58) Field of Classification Search ................ 375/254, 375/376, 354
See application file for complete search history.

(56) References Cited

U.S. PATENT DOCUMENTS

| 3,900,890 | A | * | 8/1975 | Eibner | 360/73.04 |
|---|---|---|---|---|---|
| 4,352,074 | A | * | 9/1982 | Blinchikoff et al. | 331/17 |
| 4,706,263 | A | * | 11/1987 | von der Embse | 375/343 |
| 5,124,670 | A | * | 6/1992 | Lawton | 331/10 |
| 5,266,907 | A | * | 11/1993 | Dacus | 331/1 A |
| 5,369,404 | A | * | 11/1994 | Galton | 341/143 |
| 5,727,038 | A | * | 3/1998 | May et al. | 375/376 |
| 5,781,044 | A | * | 7/1998 | Riley et al. | 327/105 |
| 5,786,778 | A | * | 7/1998 | Adams et al. | 341/61 |
| 5,834,987 | A | * | 11/1998 | Dent | 332/127 |
| 5,903,194 | A | * | 5/1999 | Opsahl et al. | 331/1 A |
| 6,008,703 | A | * | 12/1999 | Perrott et al. | 332/100 |
| 6,052,034 | A | * | 4/2000 | Wang et al. | 331/2 |
| 6,147,567 | A | * | 11/2000 | Welland et al. | 331/179 |
| 6,150,891 | A | * | 11/2000 | Welland et al. | 331/25 |

(Continued)

OTHER PUBLICATIONS

Vassiliou, "A 0.18/spl mu/m CMOS Dual-Band Direct-Conversion DVB-H Receiver", ISSCC 2006, Digest of Technical Papers, IEEE International Solid-State Circuits Conference, 2006, Feb. 6-9, 2006 pp. 2494-2503.*

(Continued)

*Primary Examiner*—Juan A Torres
(74) *Attorney, Agent, or Firm*—McAndrews, Held & Malloy

(57) ABSTRACT

A method and system for filter calibration using fractional-N frequency synthesized signals are presented. The method may include generating an Local Oscillator (LO) signal by a Phase Locked Loop (PLL) circuit within a chip. A reference signal may be generated based on the generated LO signal and a synthesizer control signal. A frequency response for a filter circuit integrated within the chip may be calibrated by adjusting parameters associated with the filter circuit based on the generated LO signal. The system may include a single-chip multi-band RF receiver that enables generation of a LO signal by a PLL circuit within the single-chip, and enables calibration of a frequency response for a filter circuit integrated within the chip. A reference signal may be generated based on the generated LO signal and a synthesizer control signal. The frequency response may be calibrated by adjusting the filter based on the generated reference signal.

24 Claims, 9 Drawing Sheets

U.S. PATENT DOCUMENTS

| | | | | |
|---|---|---|---|---|
| 6,167,245 | A * | 12/2000 | Welland et al. | 455/260 |
| 6,392,493 | B1 * | 5/2002 | Minnis | 331/1 A |
| 6,429,693 | B1 * | 8/2002 | Staszewski et al. | 327/12 |
| 6,456,164 | B1 * | 9/2002 | Fan | 331/16 |
| 6,504,437 | B1 * | 1/2003 | Nelson et al. | 331/14 |
| 6,580,376 | B2 * | 6/2003 | Perrott | 341/61 |
| 6,606,004 | B2 * | 8/2003 | Staszewski et al. | 331/17 |
| 6,844,836 | B1 * | 1/2005 | Lee | 341/143 |
| 6,927,716 | B2 * | 8/2005 | Keaveney et al. | 341/143 |
| 6,995,622 | B2 * | 2/2006 | Partridge et al. | 331/66 |
| 7,061,276 | B2 * | 6/2006 | Xu | 327/2 |
| 7,075,383 | B2 * | 7/2006 | Adachi et al. | 332/127 |
| 7,092,043 | B2 * | 8/2006 | Vorenkamp et al. | 348/726 |
| 7,106,388 | B2 * | 9/2006 | Vorenkamp et al. | 348/726 |
| 7,142,835 | B2 * | 11/2006 | Paulus | 455/302 |
| 7,171,176 | B1 * | 1/2007 | Birleson | 455/173.1 |
| 7,276,978 | B2 * | 10/2007 | Puma et al. | 331/16 |
| 2001/0050579 | A1 * | 12/2001 | Han | 327/156 |
| 2002/0167360 | A1 * | 11/2002 | Smith | 331/1 A |
| 2004/0176058 | A1 * | 9/2004 | Johnson | 455/147 |
| 2005/0077969 | A1 * | 4/2005 | Lalt et al. | 331/1 A |
| 2005/0129142 | A1 * | 6/2005 | Yellin et al. | 375/302 |
| 2005/0134344 | A1 * | 6/2005 | Ro | 327/198 |
| 2005/0276358 | A1 * | 12/2005 | Pipilos | 375/345 |
| 2006/0035619 | A1 * | 2/2006 | Hallivuori et al. | 455/333 |
| 2006/0068740 | A1 * | 3/2006 | Yokoyama | 455/302 |
| 2006/0135195 | A1 * | 6/2006 | Leinonen et al. | 455/550.1 |
| 2006/0192620 | A1 * | 8/2006 | Beaulaton et al. | 331/1 A |
| 2006/0276149 | A1 * | 12/2006 | Womac et al. | 455/133 |
| 2007/0049224 | A1 * | 3/2007 | Womac | 455/189.1 |

OTHER PUBLICATIONS

Antonine, "A Direct-Conversion Receiver For DVB-H, IEEE Journal of Solid-State Circuits", vol. 40, No. 12, Dec. 2005, pp. 2536-2546.*

Antoine, "A direct-conversion receiver for DVB-H", ISSCC 2005 IEEE International Solid-State Circuits Conference, 2005, Digest of Technical Papers, Feb. 10-10, 2005 pp. 426-607 vol. 1.*

Dawkins (A Single-Chip Tuner For DVB-T, IEEE Journal of Solid-State Circuits, vol. 38, No. 8, Aug. 2003, pp. 1307-1317.*

EICTA—European Industry Association, Information Systems Communication Technologies Consumer Electronics, EICTA/TAC/MBRAI-0216, Mobile and Portable DVD-T Radio Access Interface Specification, Version 1.0, Jan. 1, 2004, pp. 1-46.*

Womac, "Global mobile TV standard makes it possible to tune in digital TV signals on the move", Jun. 2005.*

Love, "Single-chip tuner enables broadcast TV in both European and North American handsets", eeProductCenter (Jun. 6, 2005 6:32 AM ET).*

Rogers, A multiband ΔΣ fractional-N frequency synthesizer for a MIMO WLAN transceiver RFIC, IEEE Journal of Solid-State Circuits, vol. 40, Issue 3, Mar. 2005 pp. 678-689.*

Magoon, "A single-chip quad-band (850/900/1800/1900 MHz) direct conversion GSM/GPRS RF transceiver with integrated VCOs and fractional-n synthesizer", IEEE Journal of Solid-State Circuits, vol. 37, Issue 12, Dec. 2002 pp. 1710 -1720.*

Guenais,"A 18 mW triple 2 GHz CMOS PLL for 3G mobile systems with -113 dBc/Hz GSM in-band phase noise and dual-port GMSK modulation", 2003 IEEE Radio Frequency Integrated Circuits (RFIC) Symposium, Jun. 8-10, 2003 pp. 185-188.*

* cited by examiner

REPLACEMENT

REPLACEMENT ately been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The OFDM spread spectrum technique may be utilized to distribute information over many carriers that are spaced apart at specified frequencies. The OFDM technique may also be referred to as multi-carrier or discrete multi-tone modulation. This technique may result in spectral efficiency and lower multi-path distortion, for example. The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area single frequency network (SFN). There are also significant challenges in deploying broadcast services to mobile user equipment. Because of form factor constraints, many handheld portable devices, for example, may require that Printed Circuit Board (PCB)area be minimized and that services consume minimum power to extend battery life to a level that may be acceptable to users. Another consideration is the Doppler Effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H). The broadcasting frequencies for Europe are in UHF (bands IV/V) and in the US, the 1670-1675 MHz band that has been allocated for DVB-H operation. Additional spectrum is expected to be allocated in the L-band world-wide.

To meet requirements for mobile broadcasting the DVB-H specification supports time slicing to reduce power consumption at the user equipment, addition of a 4 k mode to enable network operators to make tradeoffs between the advantages of the 2 k mode and those of the 8 k mode, and an additional level of forward error correction on multi-protocol encapsulated data—forward error correction (MPE-FEC) to make DVB-H transmissions more robust to the challenges presented by mobile reception of signals and to potential limitations in antenna designs for handheld user equipment. DVB-H may also use the DVB-T modulation schemes, like Quadrature Phase Shift Keving (QPSK) and 16-quadrature amplitude modulation (16-QAM).

While several adaptations have been made to provide support for mobile broadcast capabilities in DVB-T, concerns regarding device size, cost, and/or power requirements still remain significant constraints for the implementation of handheld portable devices enabled for digital video broadcasting operations. For example, typical DVB-T tuners or receivers in mobile terminals may employ super-heterodyne architectures with one or two intermediate frequency (IF) stages and direct sampling of the passband signal for digital quadrature down-conversion. Moreover, external tracking and Sound Acoustic Wave (SAW) filters may generally be utilized for channel selection and image rejection. Such approaches may result in increased power consumption and high external component count, which may limit their application in handheld portable devices. As a result, the success of mobile broadcast capability of DVB-T may depend in part on the ability to develop TV tuners that have smaller form factor, are produced at lower cost, and consume less power during operation. Furthermore, process and temperature variations within conventional tuners or receivers in mobile terminals result in deviation in the characteristics of many sub-circuits of the transceiver. A very important case is the deviation of the frequency response of analog filters used within the tuners or receivers. Such deviation of the frequency response results in deterioration of channel selection capabilities of the tuners or receivers.

As mobile terminals support a wider range of content from voice to data to video, they may be required to receive a correspondingly wider range of frequencies. Consequently, filtering circuitry may be required to filter signals for correspondingly wider ranges of frequencies.

FIG. 1 is diagram for a conventional filter calibration scheme utilizing a matched oscillator. This is an indirect filter calibration techniques, meaning that filter bandwidth is calibrated through the calibration of a circuit other than the filter itself (the oscillator). Referring to FIG. 1, there is shown a filter 202, an oscillator 204, a crystal oscillator 206, a frequency divider block 208, an exclusive-or (XOR) block 210, and a control block 212.

The oscillator 204 may comprise suitable logic, circuitry, and/or code that may enable generation of a clock signal. The oscillator 204 may comprise resistive (R) and capacitive (C) components. The R and C components may be variable or fixed. When the frequency associated with the clock signal is based on the values for the R and C components, the oscillator 204 may comprise an RC oscillator circuit.

The oscillator 204 may comprise active components, for example operational amplifier (op-amp) and C components. The op-amp component may comprise one or more electrical devices characterized by one or more transconductance ($G_m$) values. The C component may comprise one or more electrical devices characterized by one or more fixed or variable capacitive values. When the frequency associated with the clock signal is based on the values for the op-amp and C components, the oscillator 204 may comprise a $G_mC$ oscillator circuit.

The frequency divider block 208 may comprise suitable logic, circuitry, and/or code that may enable generation of an output signal based on an input signal, wherein the input signal is characterized by a frequency that is a multiple of the corresponding frequency of the output signal. The value of each corresponding frequency may be determined by the frequency divider block 208.

The XOR block 210 may comprise suitable logic, circuitry, and/or code that may enable generation of an output signal in which the value of the output signal is based on a comparison of respective values associated with two input signals. The XOR block 210 may output a LOW value when the respective values of the two input signals are approximately equal. The XOR block 210 may output a HIGH value when the respective values of the two input signals are not approximately equal.

The control block 212 may comprise suitable logic, circuitry, and/or code that may enable generating a control signal, $f_{Control}$, based on an input signal. The control signal may comprise an analog signal, such as a value for a voltage or a current for example, based on the input signal. The control signal may comprise a digital representation comprising one or more bits for example, based on the input signal. The control block 212 may receive an input signal from an external circuit. The control block 212 may generate the control signal based on the input signal. The control signal may be communicated to control at least a portion of the circuitry from which the input signal was received.

In operation, the crystal oscillator 206 may enable generation of a crystal (xtal) timing signal. The crystal timing signal may be characterized by a crystal frequency, $f_{xtal}$. The frequency divider 208 may receive the crystal timing signal as an input signal. The frequency divider 208 may utilize a frequency division factor, $f_D$, to generate a reference timing signal characterized by a reference frequency, $f_{Ref}$, and a reference phase $\phi_{Ref}$. The value of the reference frequency may be about equal to the ratio of the value of the reference frequency and the value of the frequency division factor, $f_{Ref}/f_D$.

The oscillator 204 may enable generation of an oscillator timing signal characterized by an oscillator frequency, $f_{Osc}$, and an oscillator phase $\phi_{Osc}$. For an oscillator 204 comprising an RC oscillator, the oscillator frequency may be referred to as an RC oscillator frequency, $f_{Osc}(RC)$. The corresponding oscillator phase may be referred to as an RC oscillator phase, $\phi_{Osc}(RC)$. The value of the RC oscillator frequency and/or phase may be based on values for the R and C components. The values for the R and/or C components may be determined based on the control signal $f_{Control}$.

The XOR block 210 may concurrently compare a value for the reference timing signal and a corresponding value for the oscillator timing signal at various time instants. Based on the comparison, the XOR block 210 may generate a difference signal. The difference signal may be nonzero when there are differences between the frequencies $f_{Ref}$ and $f_{Osc}(RC)$, at a given time instant. The difference signal may be nonzero when there are differences between the phases $\phi_{Ref}$ and $\phi_{Osc}(RC)$, at a given time instant.

The control block 212 may receive the difference signal and generate the control signal, $f_{Control}$, based on the value of the difference signal. The control block 212 may communicate the control signal, comprising feedback information, to the oscillator 204. The feedback information may cause the oscillator 204 to adjust the R and/or C values. As a result of the adjustment, the corresponding frequency and/or phase values, $f_{Osc}(RC)/\phi_{Osc}(RC)$ may be adjusted.

For an oscillator 204 comprising an $G_mC$ oscillator, the oscillator frequency may be referred to as an $G_mC$ oscillator frequency, $f_{Osc}(G_mC)$. The corresponding oscillator phase may be referred to as an $G_mC$ oscillator phase, $\phi_{Osc}(G_mC)$. The value of the $G_mC$ oscillator frequency and/or phase may be based on values for the op-amp and C components. The values for the op-amp and/or C components may be determined based on the control signal $f_{Control}$.

The difference signal generated by the XOR block 210 may be nonzero when there are differences between the frequencies $f_{Ref}$ and $f_{Osc}(G_mC)$, at a given time instant. The difference signal may be nonzero when there are differences between the phases $\phi_{Ref}$ and $\phi_{Osc}(G_mC)$, at a given time instant.

The control block 212 may receive the difference signal and generate the control signal, $f_{Control}$, based on the value of the difference signal. The control block 212 may communicate the control signal, comprising feedback information, to the oscillator 204. The feedback information may cause the oscillator 204 to adjust the $G_m$ and/or C values. As a result of the adjustment, the corresponding frequency and/or phase values, $f_{Osc}(G_mC)/\phi_{Osc}(G_mC)$, may be adjusted.

The oscillator 204 may utilize shared or common components with the filter 202. For example, for an oscillator 204 that comprises R and C components, the filter 202 may comprise equivalent R and C components. When the value for the $f_{-3\,dB}$ filter cut-off frequency is based on the values of the R and C components, the filter 202 may comprise an RC filter circuit. For an oscillator 204 that comprises op-amp components and C components, the filter 202 may comprise equivalent op-amp and C components. When the value for the $f_{-3\,dB}$ filter cut-off frequency is based on the values of the op-amp and C components, the filter 202 may comprise a $G_mC$ filter circuit.

For a filter 202 comprising an RC filter circuit, the control signal, $f_{Control}$, generated by the control block 212 may cause the filter 202 to adjust the R and/or C values for the equivalent R and/or C components. As a result of the adjustment, the corresponding value for the $f_{-3\,dB}$ filter cut-off frequency may be adjusted. For a filter 202 comprising a $G_mC$ filter circuit, the control signal, $f_{Control}$, generated by the control block 212 may cause the filter 202 to adjust the $G_m$ and/or C values for the equivalent op-amp and/or C components. As a result of the adjustment, the corresponding value for the $f_{-3\,dB}$ filter cut-off frequency may be adjusted.

The oscillator 204 may be utilized to calibrate the filter 202 since the control signal, $f_{Control}$, is generated based on the oscillator frequency $f_{Osc}$, and/or oscillator phase $\phi_{Osc}$. The control signal may cause the filter 202 to compute a value for the $f_{-3\,dB}$ filter cut-off frequency. A disadvantage in this method is that the accuracy of the calibration may be limited based on the extent to which the values for the R and C components in the oscillator 204 are equal to corresponding values for the equivalent R and C components in the filter 202, for a given value of the control signal $f_{Control}$. The accuracy of the calibration may also be limited based on the range of values for frequency, $f_{Ref}$, and/or phase, $\phi_{Ref}$, which may be generated by the frequency divider block 208.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for filter calibration using fractional-N frequency synthesized signals, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention provide a method and system for filter calibration using fractional-N frequency synthesized signals. Aspects of the method may comprise generating a LO signal by a PLL circuit within a chip. A reference signal may be generated based on the generated LO signal and a synthesizer control signal. The method may further comprise calibrating a frequency response for a filter circuit integrated within the chip by adjusting parameters associated with the filter circuit based on the generated reference signal. Aspects of the system may include a single-chip multi-band RF receiver that enables generation of a LO signal by a PLL circuit within the single-chip. A reference signal may be generated based on the generated LO signal and a synthesizer control signal. The single-chip multi-band RF receiver may enable calibration of a frequency response for a filter circuit integrated within the chip. The frequency response may be calibrated by adjusting the filter based on the generated reference signal.

Various embodiments of the invention may comprise a scheme for calibrating a filter in a communication receiver without requiring additional circuitry. In such embodiments, a Σ-Δ fractional-N synthesizer may be utilized for synthesizing RF signals. The Σ-Δ fractional-N synthesizer may enable the generation of a wide range of reference signal frequencies. In addition, the Σ-Δ fractional-N synthesizer may enable more accurate generation of a specified filter cutoff frequency $f_{-3\,dB}$ than may be the case with many conventional filter calibration schemes. Various embodiments of the invention may utilize a digital frequency synthesizer to enable even greater accuracy in the generation of a specific frequency $f_{-3\,dB}$.

Figure 2A:
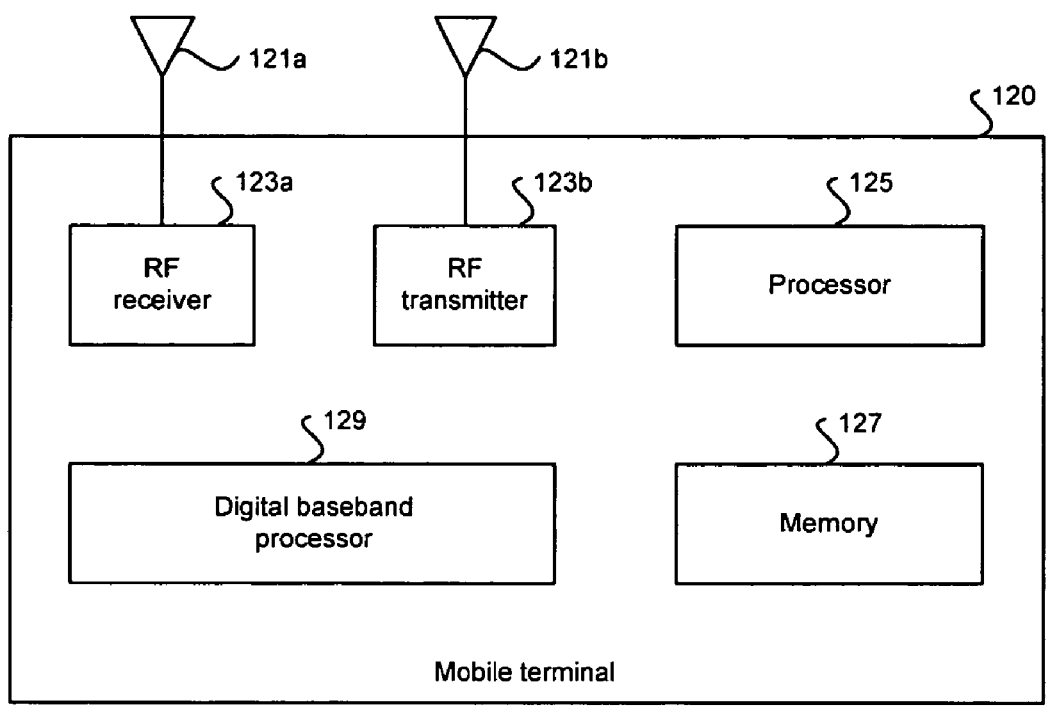
FIG. 2A is a block diagram illustrating an exemplary mobile terminal, in accordance with an embodiment of the invention.

FIG. 2A is a block diagram illustrating an exemplary mobile terminal, in accordance with an embodiment of the invention. Referring to FIG. 2A, there is shown a mobile terminal 120 that may comprise an RF receiver 123a, an RF transmitter 123b, a digital baseband processor 129, a processor 125, and a memory 127. A receive antenna 121a may be communicatively coupled to the RF receiver 123a. A transmit antenna 121b may be communicatively coupled to the RF transmitter 123b. The mobile terminal 120 may be operated in a system, such as the cellular network and/or digital video broadcast network described in FIG. 2A, for example.

The RF receiver 123a may comprise suitable logic, circuitry, and/or code that may enable processing of received RF signals. The RF receiver 123a may enable receiving RF signals in a plurality of frequency bands. For example, the RF receiver 123a may enable receiving DVB-H transmission signals via the VHF band, from about 174 MHz to about 240 MHz, the UHF band, from about 470 MHz to about 890 MHz, the 1670-1675 MHz band, and/or the L-band, from about 1400 MHz to about 1700 MHz, for example. Moreover, the RF receiver 123a may enable receiving signals in cellular frequency bands, for example. Each frequency band supported by the RF receiver 123a may have a corresponding front-end circuit for handling low noise amplification and down conversion operations, for example. In this regard, the RF receiver 123a may be referred to as a multi-band receiver when it supports more than one frequency band. In another embodiment of the invention, the mobile terminal 120 may comprise more than one RF receiver 123a, wherein each of the RF receivers 123a may be a single-band or a multi-band receiver.

The RF receiver 123a may quadrature down convert the received RF signal to a baseband frequency signal that comprises an in-phase (I) component and a quadrature (Q) component. The RF receiver 123a may perform direct down conversion of the received RF signal to a baseband frequency signal, for example. In some instances, the RF receiver 123a may enable analog-to-digital conversion of the baseband signal components before transferring the components to the digital baseband processor 129. In other instances, the RF receiver 123a may transfer the baseband signal components in analog form.

The digital baseband processor 129 may comprise suitable logic, circuitry, and/or code that may enable processing and/or handling of baseband frequency signals. In this regard, the digital baseband processor 129 may process or handle signals received from the RF receiver 123a and/or signals to be transferred to the RF transmitter 123b, when the RF transmitter 123b is present, for transmission to the network. The digital baseband processor 129 may also provide control and/or feedback information to the RF receiver 123a and to the RF transmitter 123b based on information from the processed signals. The digital baseband processor 129 may communicate information and/or data from the processed signals to the processor 125 and/or to the memory 127. Moreover, the digital baseband processor 129 may receive information from the processor 125 and/or to the memory 127, which may be processed and transferred to the RF transmitter 123b for transmission to the network.

The RF transmitter 123b may comprise suitable logic, circuitry, and/or code that may enable processing of RF signals for transmission. The RF transmitter 123b may enable transmission of RF signals in a plurality of frequency bands. Moreover, the RF transmitter 123b may enable transmitting signals in cellular frequency bands, for example. Each frequency band supported by the RF transmitter 123b may have a corresponding front-end circuit for handling amplification and up conversion operations, for example. In this regard, the RF transmitter 123b may be referred to as a multi-band transmitter when it supports more than one frequency band. In another embodiment of the invention, the mobile terminal 120 may comprise more than one RF transmitter 123b, wherein each of the RF transmitters 123b may be a single-band or a multi-band transmitter.

The RF transmitter 123b may quadrature up convert the baseband frequency signal comprising I/Q components to an RF signal. The RF transmitter 123b may perform direct up conversion of the baseband frequency signal to a baseband frequency signal, for example. In some instances, the RF transmitter 123b may enable digital-to-analog conversion of the baseband signal components received from the digital baseband processor 129 before up conversion. In other instances, the RF transmitter 123b may receive baseband signal components in analog form.

The processor 125 may comprise suitable logic, circuitry, and/or code that may enable control and/or data processing operations for the mobile terminal 120. The processor 125 may be utilized to control at least a portion of the RF receiver 123a, the RF transmitter 123b, the digital baseband processor 129, and/or the memory 127. In this regard, the processor 125 may generate at least one signal for controlling operations within the mobile terminal 120. The processor 125 may also enable executing of applications that may be utilized by the mobile terminal 120. For example, the processor 125 may execute applications that may enable displaying and/or interacting with content received via DVB-H transmission signals in the mobile terminal 120.

The memory 127 may comprise suitable logic, circuitry, and/or code that may enable storage of data and/or other information utilized by the mobile terminal 120. For example, the memory 127 may be utilized for storing processed data generated by the digital baseband processor 129 and/or the processor 125. The memory 127 may also be utilized to store information, such as configuration information, that may be utilized to control the operation of at least one block in the mobile terminal 120. For example, the memory 127 may comprise information necessary to configure the RF receiver 123a to enable receiving DVB-H transmission in the appropriate frequency band.

Figure 2B:
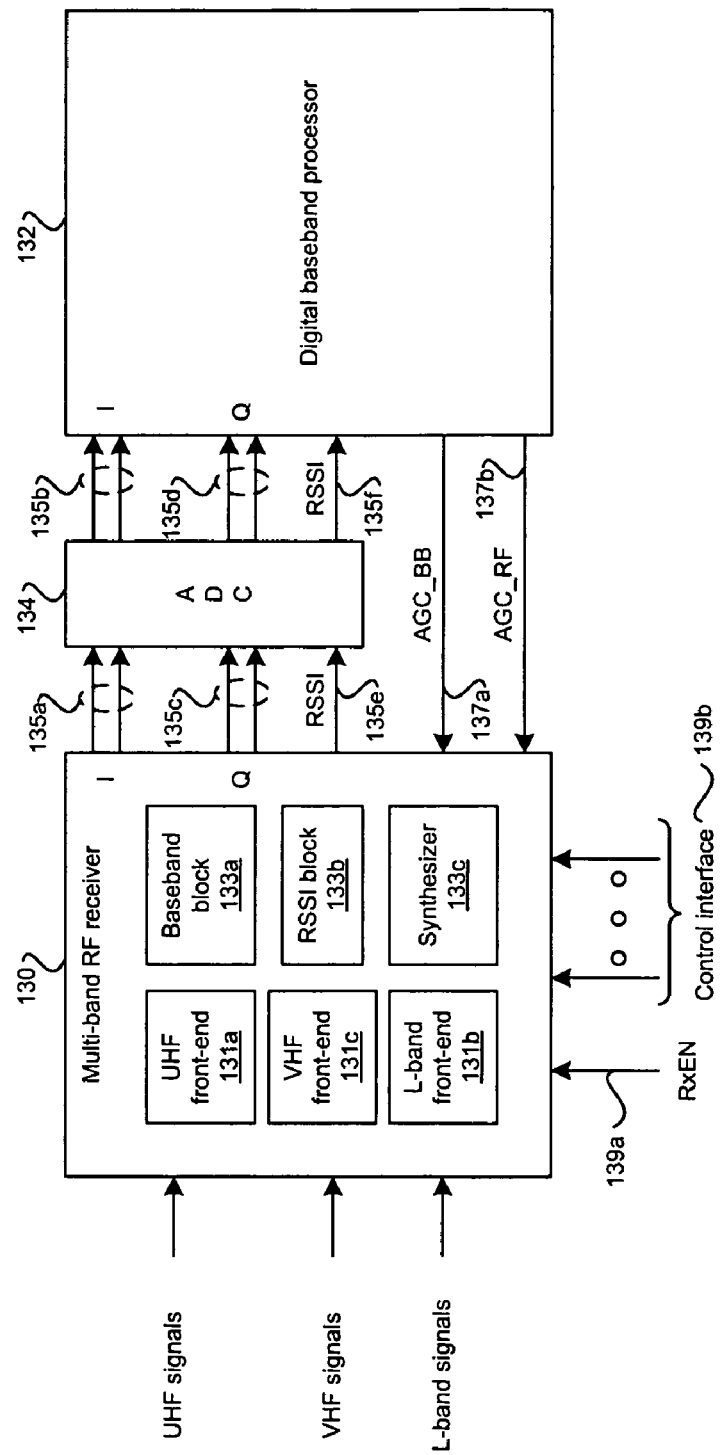
FIG. 2B is a block diagram illustrating exemplary communication between a multi-band RF receiver and a digital baseband processor in a mobile terminal, in accordance with an embodiment of the invention.

FIG. 2B is a block diagram illustrating exemplary communication between a multi-band RF receiver and a digital baseband processor in a mobile terminal, in accordance with an embodiment of the invention. Referring to FIG. 2B, there is shown a multi-band RF receiver 130, an analog-to-digital converter (ADC) 134, and a digital baseband processor 132. The multi-band RF receiver 130 may comprise a UHF front-end 131a, an L-band front-end 131b, a VHF front-end 131c, a baseband block 133a, a received signal strength indicator (RSSI) block 133b, and a synthesizer 133c. The multi-band RF receiver 130, the analog-to-digital converter (ADC) 134, and/or the digital baseband processor 132 may be part of a mobile terminal, such as the mobile terminal 120 in FIG. 2A, for example.

The multi-band RF receiver 130 may comprise suitable logic, circuitry, and/or code that may enable handling of VHF, UHF and L-band signals. The multi-band RF receiver 130 may be enabled via an enable signal, such as the signal RxEN 139a, for example. In this regard, enabling the multi-band RF receiver 130 via the signal RxEN 139a by a 1:10 ON/OFF ratio may allow time slicing in DVB-H while reducing power consumption. At least a portion of the circuitry within the multi-band RF receiver 130 may be controlled via the control interface 139b. The control interface 139b may receive information from, for example, a processor, such as the processor 125 in FIG. 2A, or from the digital baseband processor 132. The control interface 139b may comprise more than one bit. For example, when implemented as a 2-bit interface, the control interface 139a may be an inter-integrated circuit (I2C) interface.

The VHF front-end 131c may comprise suitable logic, circuitry, and/or code that may enable low noise amplification and direct down conversion of VHF signals. In this regard, the VHF front-end 131c may utilize an integrated low noise amplifier (LNA) and mixers, such as passive mixers, for example. The VHF front-end 131c may communicate the resulting baseband frequency signals to the baseband block 133a for further processing.

The UHF front-end 131a may comprise suitable logic, circuitry, and/or code that may enable low noise amplification and direct down conversion of UHF signals. In this regard, the UHF front-end 131a may utilize an integrated low noise amplifier (LNA) and mixers, such as passive mixers, for example. The UHF front-end 131a may communicate the resulting baseband frequency signals to the baseband block 133a for further processing.

The L-band front-end 131b may comprise suitable logic, circuitry, and/or code that may enable low noise amplification and direct down conversion of L-band signals. In this regard, the L-band front-end 131b may utilize an integrated LNA and mixers, such as passive mixers, for example. The L-band front-end 131b may communicate the resulting baseband frequency signals to the baseband block 133a for further processing. The multi-band RF receiver 130 may enable one of the VHF front-end 131c, the UHF front-end 131a and the L-band front-end 131b based on current communication conditions.

The synthesizer 133c may comprise suitable logic, circuitry, and/or code that may enable generating the appropriate local oscillator (LO) signal for performing direct down conversion in either the VHF front-end 131c, the UHF front-end 131a or the L-band front-end 131b. Since the synthesizer 133c may enable fractional division of a source frequency when generating the LO signal, a large range of crystal oscillators may be utilized as a frequency source for the synthesizer 133c. This approach may enable the use of an existing crystal oscillator in a mobile terminal PCB, thus reducing the number of external components necessary to support the operations of the multi-band RF receiver 130, for example. The synthesizer 133c may generate a common LO signal for the VHF front-end 131c, the UHF front-end 131a and for the L-band front-end 131b. In this regard, the VHF front-end 131c, the UHF front-end 131a and the L-band front-end 131b may enable dividing the LO signal in order to generate the appropriate signal to perform down conversion from the VHF band, from the UHF band and from the L-band respectively. In some instances, the synthesizer 133c may have at least one integrated voltage controlled oscillator (VCO) for generating the LO signal. In other instances, the VCO may be implemented outside the synthesizer 133c.

The baseband block 133a may comprise suitable logic, circuitry, and/or code that may enable processing of I/Q components generated from the direct down conversion operations in the VHF front-end 131c, the UHF front-end 131a and the L-band front-end 131b. The baseband block 133a may enable amplification and/or filtering of the I/Q components in analog form. The baseband block 133a may communicate the processed I component, that is, signal 135a, and the processed Q component, that is, signal 135c, to the ADC 134 for digital conversion.

The RSSI block 133b may comprise suitable logic, circuitry, and/or code that may enable measuring the strength, that is, the RSSI value, of a received RF signal, whether VHF, UHF or L-band signal. The RSSI measurement may be performed, for example, after the received RF signal is amplified in either the VHF front-end 131c, the UHF front-end 131a or the L-band front-end 131b. The RSSI block 133b may communicate the analog RSSI measurement that is, signal 135e, to the ADC 134 for digital conversion.

The ADC 134 may comprise suitable logic, circuitry, and/or code that may enable digital conversion of signals 135a, 135c, and/or 135e to signals 135b, 135d, and/or 135f respectively. In some instances, the ADC 134 may be integrated into the multi-band RF receiver 130 or into the digital baseband processor 132.

The digital baseband processor 132 may comprise suitable logic, circuitry, and/or code that may enable processing and/or handling of baseband frequency signals. In this regard, the digital baseband processor 132 may be the same or substantially similar to the digital baseband processor 129 described in FIG. 2A. The digital baseband processor 132 may enable generating at least one signal, such as the signals AGC_BB 137a and AGC_RF 137b, for adjusting the operations of the multi-band RF receiver 130. For example, the signal AGC_BB 137a may be utilized to adjust the gain provided by the baseband block 133a on the baseband frequency signals generated from either the VHF front-end 131c, the UHF front-end 131a or the L-band front-end 131b. In another example, the signal AGC_RF 137b may be utilized to adjust the gain provided by an integrated LNA in either the VHF front-end 131c, the UHF front-end 131a or the L-band front-end 131b. In another example, the digital baseband processor 132 may generate at least one control signal or control information communicated to the multi-band RF receiver 130 via the control interface 139b for adjusting operations within the multi-band RF receiver 130.

Figure 2C:
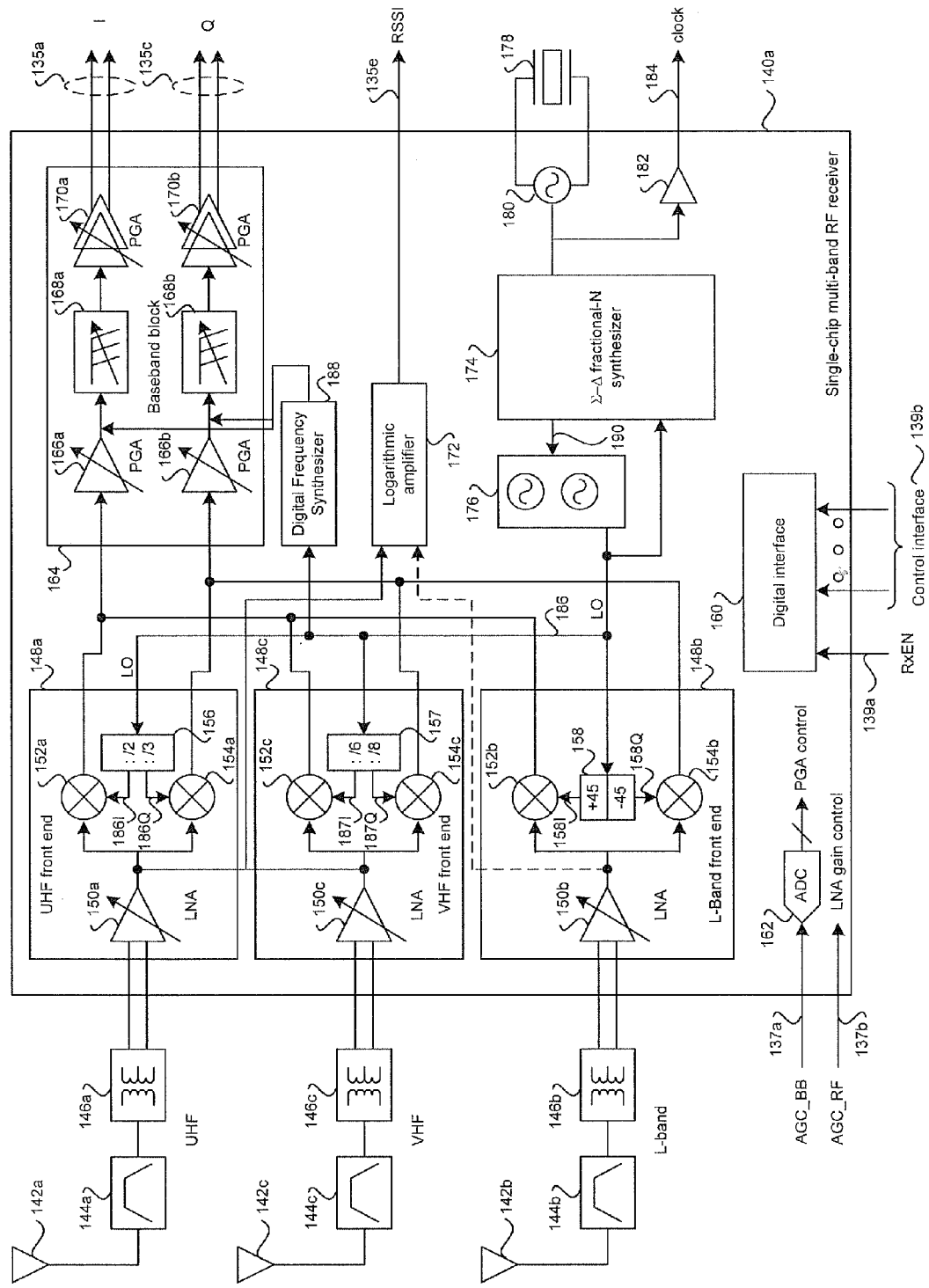
FIG. 2C is a block diagram illustrating an exemplary single-chip multi-band RF receiver with an integrated LNA in each front-end, in accordance with an embodiment of the invention.

FIG. 2C is a block diagram illustrating an exemplary single-chip multi-band RF receiver with an integrated LNA in each front-end, in accordance with an embodiment of the invention. Referring to FIG. 2C, there is shown a single-chip multi-band RF receiver 140a that may comprise a VHF front-end 148c, a UHF front-end 148a, an L-band front-end 148b, a baseband block 164, a digital frequency synthesizer 188, a logarithmic amplifier (logarithmic amplifier) 172, a Σ-Δ fractional-N synthesizer 174, a VCO block 176, a digital interface 160, an ADC 162, an oscillator 180, and a buffer 182.

The single-chip multi-band RF receiver 140a may be fabricated using any of a plurality of semiconductor manufacturing processes, for example, complimentary metal-oxide-semiconductor (CMOS) processes, bipolar CMOS (BiCMOS), or Silicon Germanium (SiGe). The single-chip multi-band RF receiver 140a may be implemented using differential structures to minimize noise effects and/or substrate coupling, for example. The single-chip multi-band RF receiver 140a may utilize low drop out (LDO) voltage regulators to regulate and clean up on-chip voltage supplies. In this regard, the LDO voltage regulators may be utilized to transform external voltage sources to the appropriate on-chip voltages.

When the single-chip multi-band RF receiver 140a is implemented utilizing a CMOS process, some design considerations may include achieving low noise figure (NF) values, wide-band operation, high signal-to-noise ration (SNR), performing DC offset removal, achieving high input second-order and third-order intercept points (IIP2 and IIP3), and/or reducing I/Q mismatch, for example.

The single-chip multi-band RF receiver 140a may receive UHF signals via a first antenna 142a, a UHF filter 144a, and a first balum 146a. The UHF filter 144a enables band pass filtering, wherein the band pass may be about 470 to about 702 MHz for cellular signals, for example, or about 470 to about 862 MHz, for other types of received signals, for example. The balum 146a enables balancing the filtered signals before being communicated to the UHF front-end 148a.

The single-chip multi-band RF receiver 140a may receive L-band signals via a second antenna 142b, an L-band filter 144b, and a second balum 146b. The L-band filter 144b enables band pass filtering, wherein the band pass may be about 1670 to about 1675 MHz for signals in US systems, for example, or about 1450 to about 1490 MHz, for signals in European systems, for example. The balum 146b enables balancing the filtered signals before being communicated to the L-band front-end 148a. In some instances, antennas 142a and 142b may be implemented utilizing a single antenna communicatively coupled to the single-chip multi-band RF receiver 140a that may support receiving radio signals operating in the UHF IV/V and/or L-band, for example.

The single-chip multi-band RF receiver 140a may receive VHF signals via a third antenna 142c, a VHF filter 144c, and a third balum 146c. The VHF filter 144c enables band pass filtering, wherein the band pass may be about 174 to about 240 MHz, for example. The balum 146c enables balancing the filtered signals before being communicated to the VHF front-end 148c.

The UHF front-end 148a may comprise a variable low noise amplifier (LNA) 150a, a mixer 152a, a mixer 154a, and a LO signal divider 156. The variable LNA 150a may comprise suitable logic and/or circuitry that may enable amplification of the UHF signals received. Matching between the output of the balum 146a and the input of the variable LNA 150a may be achieved by utilizing off-chip series inductors, for example. The variable LNA 150a may implement continuous gain control by current steering that may be controlled by a replica scheme within the variable LNA 150a. The gain of the variable LNA 150a may be adjusted via the signal AGC_RF 137b, for example.

The mixers 152a and 154a may comprise suitable logic and/or circuitry that may enable generating in-phase (I) and quadrature (Q) components of the baseband frequency signal based on direct down conversion of the amplified received UHF signal with the quadrature signals 186I and 186Q generated by the divider block 156. The mixers 152a and 154a may be passive mixers in order to achieve high linearity and/or low flicker noise, for example. The LO signal divider 156 may comprise suitable logic, circuitry, and/or code that may enable dividing of the LO signal 186 by a factor of 2 (:/2) or a factor of 3 (:/3) and at the same time provide quadrature outputs 186I and 186Q, wherein 186I and 186Q have 90 degrees separation between them. The factor of 3 division may be used when the received UHF signal band is about 470 to about 600 MHz, for example. The factor of 2 division may be used when the received UHF signal band is about 600 to about 900 MHz, for example. The I/Q components generated by the mixers 152a and 154a may be communicated to the baseband block 164.

The L-band front-end 148b may comprise a variable LNA 150b, a mixer 152b6, a mixer 154b, and a LO signal generator 158. The variable LNA 150b may comprise suitable logic and/or circuitry that may enable amplification of the L-band signals received. Matching between the output of the balum 146b and the input of the variable LNA 150b may be achieved by utilizing off-chip series inductors, for example. The variable LNA 150b may implement continuous gain control by current steering that may be controlled by a replica scheme within the variable LNA 150b. The gain of the variable LNA 150b may be adjusted via the signal AGC_RF 137b, for example.

The mixers 152b and 154b may comprise suitable logic and/or circuitry that may enable generating I/Q components of the baseband frequency signal based on the direct down conversion of the amplified received L-band signal with the LO signals 158I and 158Q generated by the LO generator block 158. The mixers 152b and 154b may be passive mixers in order to achieve high linearity and/or low flicker noise, for example. The LO signal generator 158 may comprise suitable logic, circuitry, and/or code that may enable generation of quadrature LO signals 158I and 158Q, that is, signals with 90 degree phase split between them, from the LO signal 186. The I/Q components generated by the mixers 152b and 154b may be communicated to the baseband block 164.

The VHF front-end 148c may comprise a variable low noise amplifier (LNA) 150c, a mixer 152c, a mixer 154c, and a LO signal divider 157. The variable LNA 150c may comprise suitable logic and/or circuitry that may enable amplification of the VHF signals received. Matching between the output of the balum 146c and the input of the variable LNA 150c may be achieved by utilizing off-chip series inductors, for example. The variable LNA 150c may implement continuous gain control by current steering that may be controlled by a replica scheme within the variable LNA 150c. The gain of the variable LNA 150c may be adjusted via the signal AGC_RF 137b, for example.

The mixers 152c and 154c may comprise suitable logic and/or circuitry that may enable generating in-phase (I) and quadrature (Q) components of the baseband frequency signal based on direct down conversion of the amplified received VHF signal with the quadrature signals 187I and 187Q generated by the divider block 157. The mixers 152c and 154c may be passive mixers in order to achieve high linearity and/or low flicker noise, for example. The LO signal divider 157 may comprise suitable logic, circuitry, and/or code that may enable dividing of the LO signal 186 by a factor of 6 (:/6) or a factor of 8 (:/8) and at the same time provide quadrature outputs 187I and 187Q, wherein 187I and 187Q have 90 degrees separation between them. The I/Q components generated by the mixers 152c and 154c may be communicated to the baseband block 164.

The digital frequency synthesizer 188 may comprise suitable logic, circuitry, and/or code that may enable generation of a reference signal based on a clock timing signal, and on a control input signal. In various embodiments of the invention, the digital frequency synthesizer 188 may implement a look up table (LUT) function wherein a given clock timing signal and control input signal combination may correspond to a frequency, phase, and/or magnitude for a generated reference signal. Data utilized for the LUT function may be stored and/or retrieved from the memory 127 (FIG. 2A), for example. In other embodiments of the invention, the digital frequency synthesizer 188 may comprise an over-sampling digital to analog conversion (DAC) function in which the digital frequency synthesizer 188 performs digital sampling of the clock timing signal. A rate of digital sampling may be determined based on the control input signal.

The logarithmic amplifier 172 may comprise suitable logic, circuitry, and/or code that may enable generation of a wideband, received signal strength indicator (RSSI) signal, such as the signal 135e, based on the output of the variable LNA 150a. The RSSI signal indicates the total amount of signal power that is present at the output of the LNA, for example. The RSSI signal may be utilized by, for example, the digital baseband processor 132 in FIG. 2C, to adjust the gain of the variable LNA 150a in the presence of RF interference to achieve NF and/or linearity performance that meets blocking and/or intermodulation specifications, for example. In this regard, interference may refer to blocker signals, for example. Blocker signals may be unwanted signals in frequency channels outside the wanted or desired channel that may disturb the reception of the wanted signals. This effect may be a result of blockers generating large signals within the receiver path. These large signals may introduce harmonics, intermodulation products, and/or unwanted mixing products that crosstalk with the wanted signals. In another embodiment of the invention, the logarithmic amplifier 172 may enable generating a wideband, RSSI signal, such as the signal 135e, based on the output of the variable LNA 150b. In this instance, the RSSI signal may be utilized by to adjust the gain of the variable LNA 150b.

The baseband block 164 may comprise an in-phase component processing path and a quadrature component processing path. The in-phase processing path may comprise at least one programmable gain amplifier (PGA) 166a, a baseband filter 168a, and at least one PGA 170a. The quadrature component processing path may comprise at least one PGA 166b, a baseband filter 168b, and at least one PGA 170b. The PGAs 166a, 166b, 170a, and 170b may comprise suitable logic, circuitry, and/or code that may enable amplification of the down converted components of the baseband frequency signal generated by the RF front-end. The gain of the PGAs 166a, 166b, 170a, and 170b may be digitally programmable. In addition, at the output of the PGAs 166a and 166b, a programmable pole may be utilized to reduce linearity requirements for the baseband filters 168a and 168b respectively. Since the static and time-varying DC offset may saturate the operation of the single-chip multi-band RF receiver 140a, the PGAs 166a, 166b, 170a, and 170b may utilize DC servo loops to address DC offset issues. The gain of the PGAs 166a, 166b, 170a, and/or 170b may be controlled via the AGC_BB signal 137a, for example. In this regard, the ADC 162 may be utilized to provide digital control of the PGAs 166a, 166b, 170a, and/or 170b when the AGC_BB signal 137a is an analog signal.

The baseband filters 168a and 168b may comprise suitable logic, circuitry, and/or code that may enable channel selection, for example. Channel selection may be performed by filters, such as an $N^{th}$ order lowpass Chebyschev filter implemented by opamp-RC active integrators in a leapfrog configuration, for example. For the correct tuning of the characteristics of the filters, an on-chip auto-calibration loop may be activated upon power-up. The auto-calibration loop may set up the cut-off frequency, $f_{-3\ dB}$ to the correct vale required to meet the requirements of the communications standard for which the receiver is designed. For example, in DVB-T/DVB-H, the value $f_{-3\ dB}$ of the filter cut-off frequency may be set to a value from 2 to 5 MHz thus supporting the different channel bandwidths of 5-8 MHz specified by DVB-T/DVB-H standards. During auto-calibration, a tone at the appropriate $f_{-3\ dB}$ may be generated by the digital frequency synthesizer 188 and may be applied at the input of the baseband filters 168a and 168b for comparison with the filter output of a root-mean-squared (RMS) detector. A digitally controlled loop may be utilized to adjust the baseband filter bandwidth until the output of the baseband filter and the RMS detector are the same.

The Σ-Δ fractional-N synthesizer 174 may comprise suitable logic, circuitry, and/or code that may enable LO generation that may be independent of the reference crystal frequency, such as the crystal 178, for example. In this regard, the synthesizer 174 may generate a signal, such as the signal 190, for example, to control the operation of the VCO block 176 and therefore the generation of the LO signal 186. Since the synthesizer 174 may enable fractional synthesis, the single-chip multi band RF receiver 140a may utilize the same crystal utilized by other operations in the mobile terminal while maintaining fine tuning capability. The synthesizer 174 may receive a reference frequency signal from the crystal 178 via an oscillator 180, for example. The output of the oscillator 180 may also be buffered by the buffer 182 to generate a clock signal 184, for example.

The VCO block 176 may comprise suitable logic, circuitry, and/or code that may enable generating the LO signal 186 utilized by the VHF front-end 148c, the UHF front-end 148a and the L-band front-end 148b for direct down conversion of the received RF signals. The VCO block 176 may comprise at least one VCO, wherein each VCO may have cross-coupled NMOS and PMOS devices and metal-oxide-semiconductor (MOS) varactors in an accumulation mode for tuning. In this regard, a switched varactor bank may be utilized for providing coarse tuning. The VCO block 176 may provide a range of about 1.2 to about 1.8 GHz when implemented utilizing two VCOs, for example. When more than one VCO is utilized in implementing the VCO block 176, selecting the proper VCO for generating the LO signal 186 may be based on the type of RF signal being received by the single-chip multi band RF receiver 140a.

The digital interface 160 may comprise suitable logic, circuitry, and/or code that may enable controlling circuitry within the single-chip multi band RF receiver 140a. The digital interface 160 may comprise a plurality of registers for storing control and/or operational information for use by the single-chip multi-band RF receiver 140a. The digital interface 160 may enable receiving the signal RxEN 139a that may be utilized to perform 1:10 ON/OFF ratio time slicing in DVB-H while reducing power consumption. Moreover, the digital interface 160 may enable receiving the control interface 139b from, for example, a processor, such as the processor 125 in FIG. 2A, or from the digital baseband processor 132 in FIG. 2C. The control interface 139b may comprise more than one bit. The control interface 139b may be utilized to control the synthesis operations of the synthesizer 174 and/or the filtering operations of the baseband filters 168a and 168b. The control interface 139b may also be utilized to adjust the bias of circuits within the single-chip multi-band RF receiver 140a, such as those of the variable LNAs 150a and 150b, the PGAs 166a, 166b, 170a, and 170b, and/or the baseband filters 168a and 168b, for example.

Figure 1:
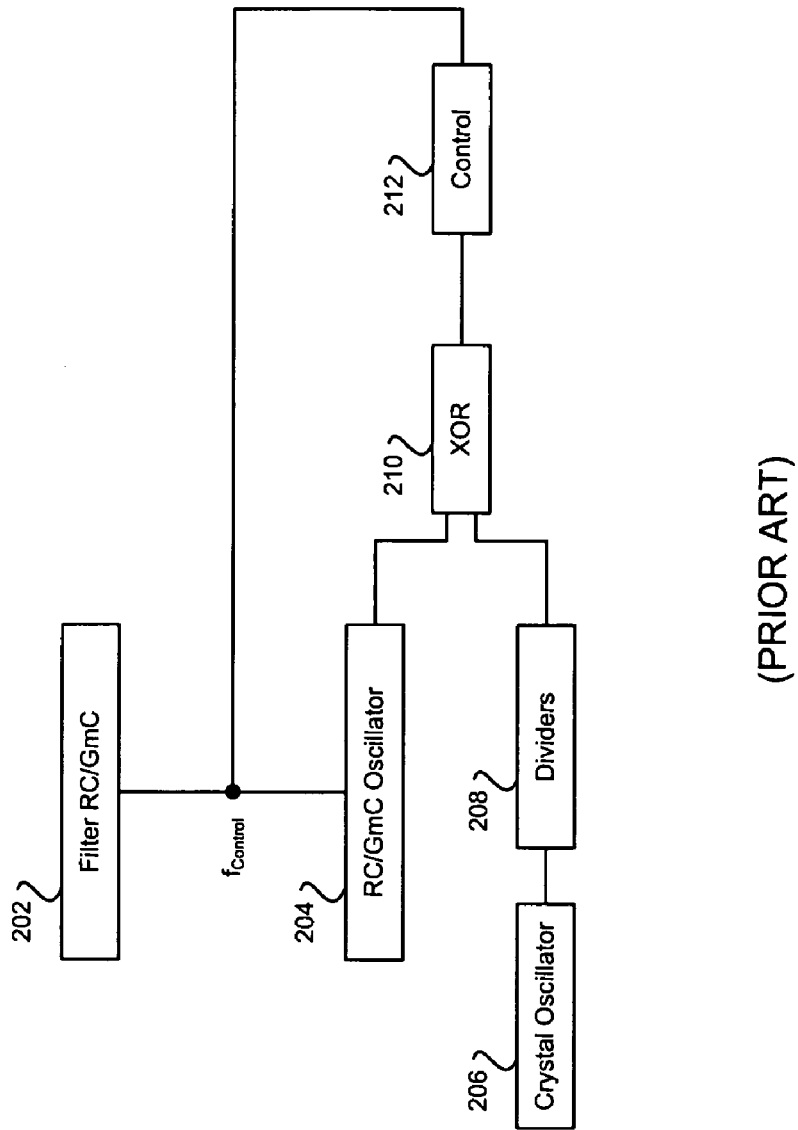
FIG. 1 is diagram for a conventional filter calibration scheme utilizing a matched oscillator.
Figure 2D:
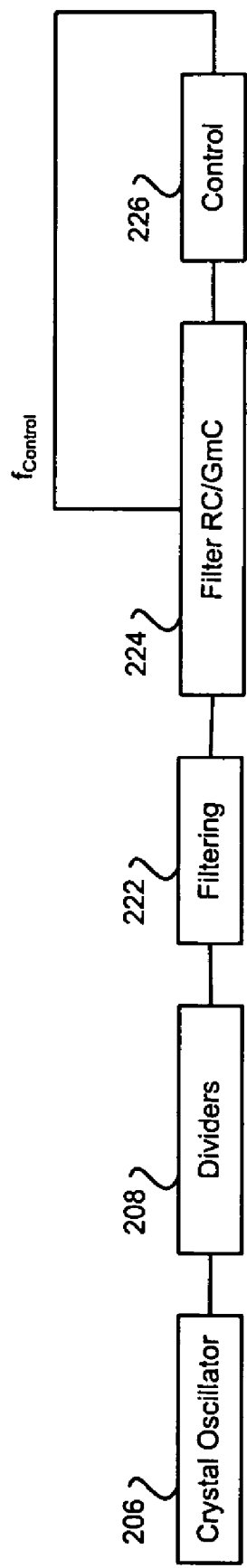
FIG. 2D is a diagram for an exemplary direct filter calibration scheme utilizing filtering, which may be utilized in connection with an embodiment of the invention.

FIG. 2D is a diagram for an exemplary direct filter calibration scheme utilizing filtering, which may be utilized in connection with an embodiment of the invention. Referring to FIG. 2D, there is shown a crystal oscillator 206, a frequency divider block 208, a filtering block 222, a filter block 224, and a control block 226. The crystal oscillator block 206 may substantially comprise the functions of the crystal 178, and the oscillator 180 (FIG. 2C). The frequency divider block 208 may be substantially as described in FIG. 1. The control block 226 may be substantially as described for the control block 212 in FIG. 1. The filter block 224 may substantially comprise the functions of the baseband filter 168a. When the value for the $f_{-3\ dB}$ filter cut-off frequency is based on the values of R and C components, the filter 224 may comprise an opamp-RC filter circuit. For the opamp-RC filter circuit, the $f_{-3\ dB}$ filter cut-off frequency may be referred to as a $f_{-3\ dB}(RC)$ filter cut-off frequency. When the value for the $f_{-3\ dB}$ filter cut-off frequency is based on the values of transconductors and C components, the filter 224 may comprise a $G_mC$ filter circuit. For the RC filter circuit, the $f_{-3\,dB}$ filter cut-off frequency may be referred to as a $f_{-3\,dB}(G_mC)$ filter cut-off frequency.

The filtering block 222 may comprise suitable logic, circuitry, and/or code that may enable generation of an output signal by removing harmonic frequency components from a received input signal. The function of the filtering block 222 may be practiced by implementations comprising a low pass filter, a high pass filter, and/or a band pass filter.

In operation, the crystal oscillator 206 may enable generation of a crystal (xtal) timing signal. The crystal timing signal may be characterized by a crystal frequency, $f_{Xtal}$. The frequency divider 208 may receive the crystal timing signal as an input signal. The frequency divider 208 may utilize a frequency division factor, $f_D$, to generate a reference timing signal characterized by a reference frequency, $f_{Ref}$. The value of the reference frequency may be approximately equal to the ratio of the value of the reference frequency and the value of the frequency division factor, $f_{Ref}/f_D$.

The filtering block 222 may enable generation of a filtered reference timing signal based on the reference timing signal. The filtered reference timing signal may also be characterized by the reference frequency. The filtering block 222 may generate the filtered reference timing signal may attenuating frequency components in the reference timing signal, which are characterized by harmonic frequencies of the reference frequency.

For a filter block 224 comprising an opamp-RC filter circuit, the control signal, $f_{Control}$, generated by the control block 226 may cause the filter block 224 to adjust the R and/or C values for the R and/or C components. As a result of the adjustment, the corresponding value for the $f_{-3\,dB}(RC)$ filter cut-off frequency may be adjusted. The filter block 224 may generate a filter calibration signal by filtering the filtered reference timing signal. The filter block 224 may perform the filtering function by attenuating certain frequency components in the filtered reference timing signal based on the $f_{-3\,dB}(RC)$ filter cut-off frequency. The filtering function performed by the filter block 224 may modify an amplitude parameter and/or phase parameter, which characterizes at least a portion of the frequency components contained within the filtered reference timing signal.

For a filter block 224 comprising an $G_mC$ filter circuit, the control signal, $f_{Control}$, generated by the control block 226 may cause the filter block 224 to adjust the $G_m$ and/or C values for the transconductor and/or C components. As a result of the adjustment, the corresponding value for the $f_{-3\,dB}(G_mC)$ filter cut-off frequency may be adjusted. The filter block 224 may generate a filter calibration signal by filtering the filtered reference timing signal. The filter block 224 may perform the filtering function by attenuating frequency components in the filtered reference timing signal based on the $f_{-3\,dB}(G_mC)$ filter cut-off frequency. The filtering function performed by the filter block 224 may modify an amplitude parameter and/or phase parameter, which characterizes at least a portion of the frequency components contained within the filtered reference timing signal.

The control block 226 may compare values of the amplitude parameters and/or phase parameters, which characterize the corresponding frequency components in the filter calibration signal received from the filter block 224. The values of the amplitude parameters and/or phase parameters may be compared with expected values for the amplitude and/or phase parameters for the corresponding frequency components. The control block may generate a control signal, $f_{Control}$, based on the comparison.

The component value mismatch problem may be avoided in comparison to the system illustrated in FIG. 1 since the control signal, $f_{Control}$, is generated based on the filter calibration signal generated by the filter block 224. This calibration method is direct as opposed to the indirect method in FIG. 1. As with the system illustrated in FIG. 1, a disadvantage in this method is that that the accuracy of the calibration may also be limited based on the range of values for frequency, $f_{Ref}$, and/or phase, $\phi_{Ref}$, which may be generated by the frequency divider block 208. In addition, embodiments of the system illustrated in FIG. 2D may require additional circuitry to implement the filtering block 222.

Figure 3A:
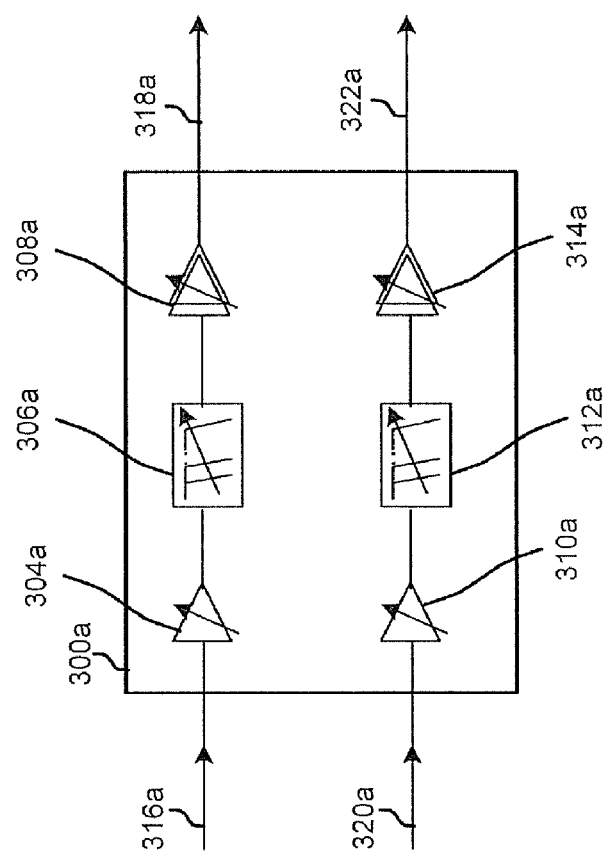
FIG. 3A is a block diagram of an exemplary analog baseband processing system supporting auto-calibration, in accordance with an embodiment of the invention.

FIG. 3A is a block diagram of an exemplary analog baseband processing system supporting auto-calibration, in accordance with an embodiment of the invention. Referring to FIG. 3A, the baseband processing block 300a may comprise a plurality of programmable gain amplifiers (PGAs) 304a, 308a, 310a, and 314a, and baseband filters 306a and 312a.

For example, the baseband processing block 300a may comprise an in-phase (I) component processing path comprising PGAs 304a and 308a, and a baseband filter 306a. The in-phase component processing path of the baseband processing block 300a may process an input in-phase (I) signal 316a to generate an output in-phase signal 318a. The input in-phase signal 316a may comprise a down converted component of a baseband frequency signal generated by an RF front end, for example. The baseband processing block 300a may also comprise a quadrature component (Q) processing path comprising PGAs 310a and 314a, and a baseband filter 312a. The quadrature component processing path of the baseband processing block 300a may process an input quadrature (Q) signal 320a to generate an output quadrature signal 322a. The input quadrature signal 320a may comprise a down converted component of a baseband frequency signal generated by an RF front end, for example.

The PGAs 304a, 308a, 310a, and 314a may comprise suitable logic, circuitry, and/or code that may enable amplification of the down converted components of the baseband frequency signals 316a and 320a. The PGAs 304a, 308a, 310a, and 314a may be digitally programmable. For example, at the output of the PGAs 304a and 310a, a programmable pole may be utilized to reduce linearity requirements for the baseband filters 306a and 312a, respectively. Furthermore, the PGAs 304a, 308a, 310a, and 314a may utilize DC servo loops to address DC offset issues. The baseband filters 306a and 312a may comprise suitable logic, circuitry, gain and/or code that may enable channel selection, for example. Channel selection may be performed by a filter bank, such as an Nth order Chebyschev filter implemented by active integrators, for example.

Figure 3B:
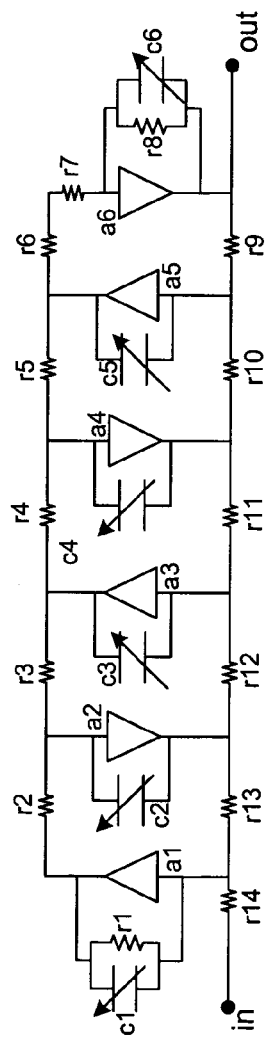
FIG. 3B is a schematic diagram of an exemplary opamp-RC baseband filter that may be used in accordance with an embodiment of the invention.

FIG. 3B is a schematic diagram of an exemplary opamp-RC baseband filter that may be used in accordance with an embodiment of the invention. Referring to FIG. 3B, the baseband filter 300b may comprise a sixth order Chebyschev filter, for example. The Chebyschev filter 300b may comprise a plurality of operational amplifiers (opamps) a1, ..., a6, a plurality of variable capacitors c1, ..., c6, and a plurality of resistors r1, ..., r14. In one embodiment of the invention, the opamp-RC integrators a1-c1-r1 and a6-c6-r8 may be arranged in a leapfrog formation. Each of the capacitors c1, ..., c6 may be implemented as a binary weighted array of capacitors that may be controlled by 6 bits, for example.

In operation, the cut-off frequency $f_{-3\,dB}$ of the Chebyschev filter 300b may be changed during channel selection. For example, the cut-off frequency $f_{-3\,dB}$ of the Chebyschev filter 300b may be set to a value from 2 MHz, for example, thereby supporting channel bandwidth of about 5 MHz to about 8 MHz, which is specified by the DVB-T standard. Even though the baseband filter 300b comprises a sixth order Chebyschev filter, the present invention may not be so limited and an Nth order low-pass filter (LPF) may be utilized instead.

Even though the baseband filter 300b is described as a Chebyschev filter, the present invention may not be so limited. Other types of filters may also be utilized, such as Butterworth, Elliptic etc., for example. Furthermore, even though operational amplifier RC integrators are utilized within the filter 300b, the present invention may not be so limited and other integrator implementations may also be utilized, such as a Gm-C integrator. Additionally, topologies other than the leapfrog formation may be utilized, such as cascaded biquads.

Figure 3C:
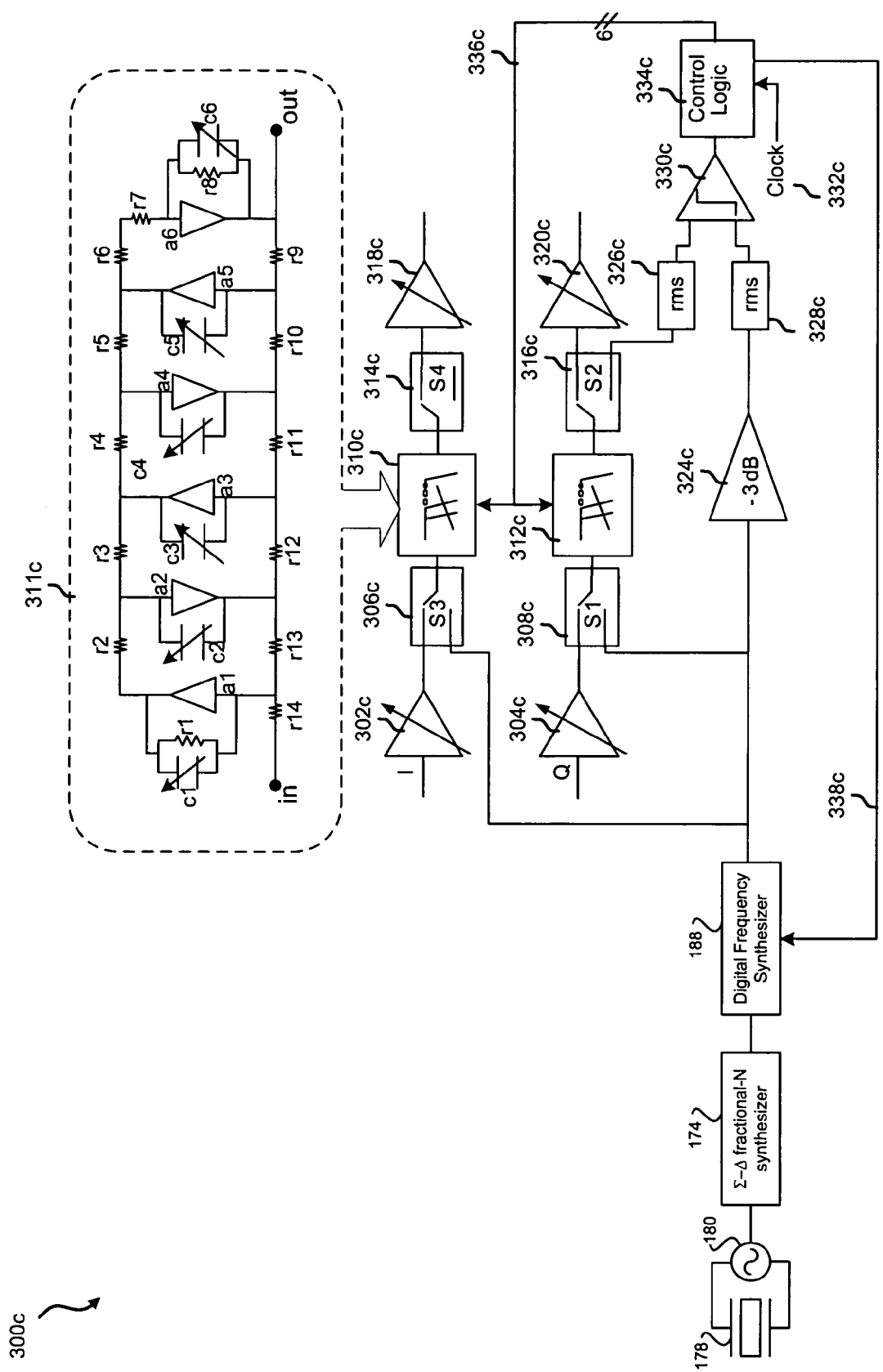
FIG. 3C is a block diagram of an exemplary baseband processing system using opamp-RC filters and an auto-calibration loop, in accordance with an embodiment of the invention.

FIG. 3C is a block diagram of an exemplary baseband processing system using opamp-RC filters and an auto-calibration loop, in accordance with an embodiment of the invention. Referring to FIG. 3C, the baseband processing block 300c may comprise a plurality of programmable gain amplifiers (PGAs) 302c, 304c, 318c, and 320c, and baseband filters 310c and 312c. In addition, the baseband processing block may comprise an auto-calibration loop circuitry. The auto-calibration loop circuitry may comprise switches 306c, 314c, 308c, and 316c, a digital frequency synthesizer 188, a Σ-Δ fractional-N synthesizer 174, a crystal 178, an oscillator 180, an amplifier 324c, root-means-square (rms) blocks 326c and 328c, a comparator 330c, and control logic block 334c. The digital frequency synthesizer 188, Σ-Δ fractional-N synthesizer 174, crystal 178, and oscillator 180 may be substantially as described in FIG. 2C.

Even though rms blocks are used within the baseband processing block 300c, the present invention may not be so limited and peak detectors may be used instead of the rms blocks.

The functionality of the PGAs 302c, 318c, 304c, and 320c may be similar to the functionality of the PGAs 304a, 308a, 310a, and 314a in FIG. 3A, respectively. Similarly, the functionality of the baseband filters 310c and 312c may be the same as the functionality of the baseband filters 306a and 312a in FIG. 3A, respectively. For example, the baseband filters 310c and 312c may each comprise a sixth order Chebyschev filters, such as the Chebyschev filter 311c or the Chebyschev filter 300b in FIG. 3B.

During an exemplary auto-calibration of the quadrature-phase signal path, the switch 308c may communicatively couple the output from the digital frequency synthesizer 188 to the input for the baseband filter 312c. The switch 316c may communicatively couple the output from the baseband filter 312c to the input for the rms block 326c. The digital frequency synthesizer 188 may generate a reference frequency signal $f_{-3\ dB}$. The reference frequency signal may then be applied at the input of the baseband filter 312c and the amplifier 324c. The amplifier 324c may attenuate the reference frequency signal by 3 dB, for example. The attenuated frequency signal may then be communicated to the rms block 328c. After the baseband filter 312c filters the reference frequency signal communicated from the digital frequency synthesizer 188, the filtered reference frequency signal may be communicated to the rms block 326c. A corresponding exemplary auto-calibration may be performed for the in-phase signal path.

Even though the digital frequency synthesizer 188 generates a reference frequency signal $f_{-3\ dB}$ that corresponds to the frequency where the filter attenuates by 3 dB the present invention may not be so limited. In this regard, digital frequency synthesizer 188 may generate a reference frequency signal $f_{-x\ dB}$ that corresponds to the frequency of a main signal attenuated from the filter by x dB in accordance with the expected frequency response of the baseband filters 310c and 312c. In such instances, the amplifier 324c may correspondingly attenuate the signal generated by the digital frequency synthesizer 188.

While the digital frequency synthesizer 188 may receive an input signal from the Σ-Δ fractional-N synthesizer 174 in the exemplary system of FIG. 3C, various embodiments of the invention may not be so limited. In various embodiments of the invention, the digital frequency synthesizer 188 may receive an LO signal from the phase locked loop (PLL) present in a communication receiver. In one aspect of the invention, a scheme for calibrating a filter in a communication receiver without requiring additional circuitry may be provided. In various embodiments of the invention, the Σ-Δ fractional-N synthesizer 174 may be utilized to enable the generation of a wide range of reference signal frequencies. In addition, the Σ-Δ fractional-N synthesizer 174 may enable more accurate generation of a specified frequency $f_{-3\ dB}$ than may be the case with many conventional filter calibration schemes. In another embodiment of the invention, a digital frequency synthesizer 188 may provide even greater accuracy in the generation of a specific frequency $f_{-3\ dB}$.

The rms blocks 326c and 328c may perform an averaging function, for example, on the filtered reference frequency signal and the attenuated reference frequency signal, respectively. The averaged filtered reference frequency signal and the attenuated reference frequency signal may be compared by the comparator 330c. A comparator output signal may be communicated from the comparator 330c to the control logic block 334c. The control logic block 334c may comprise suitable circuitry, logic, and/or code and may enable generation of a filter control signal 336c and/or synthesizer control signal 338c. The control logic block 334c may use a clock signal 332c during control signal generation. In one exemplary embodiment of the invention, if a sixth order Chebyschev filter is used within the baseband processing block 300c, the filter control signal 336c may comprise a 6-bit signal. In this regard, six bits may be used to program or adjust the capacitance of each variable capacitor $c1, \ldots, c6$ in the filter 311c.

The filter control signal 336c may be communicated to each of the baseband filters 310c, 312c. The baseband filters 310c and 312c may adjust capacitance of the variable capacitors within the filters and, thereby, change the cut-off frequency that determines filter bandwidth. The cut-off frequency and filter bandwidth of the filters 310c and 312c may be adjusted until attenuation of the reference frequency signal by the filter 312c equals 3 dB, for example. The synthesizer control signal 338c may be communicated to the digital frequency synthesizer from the control logic block 334c. The synthesizer control signal 338c may be utilized by the digital frequency synthesizer 188 to generate a reference frequency signal based on a received LO signal.

Even though an auto-calibration loop is described with respect to the quadrature signal path of the baseband processing block 300c, the same auto-calibration loop circuitry, such as the digital frequency synthesizer 188, amplifier 324c, rms blocks 326c and 328c, comparator 330c and control logic block 334c, may be used with regard to the in-phase signal path of the baseband processing block 300c.

In one embodiment of the invention, for DVB-T applications, for example, an on-chip auto-calibration loop may be activated within the baseband processing block 300c upon power-up. The auto-calibration loop may adjust the cut-off frequency $f_{-3\ dB}$ of the filter response of baseband filters 310c and 312c to a value from about 2 MHz to about 5 MHz, for example. In this regard, the baseband processing block 300c may support a plurality of channel bandwidths of 4-10 MHz, such as bandwidths specified by the DVB-T standard. A similar principle may apply to a plurality of channel bandwidths required by a specific communication standard. The auto-calibration loop may be utilized to enable adjustment of the filter cut-off frequency to a selected value as required, given that proper component value ranges have been provided in the design of the system. For example, the filter cut-off frequency may be adjusted to 210 kHz as required by the ISDB-T standard.

Figure 4:
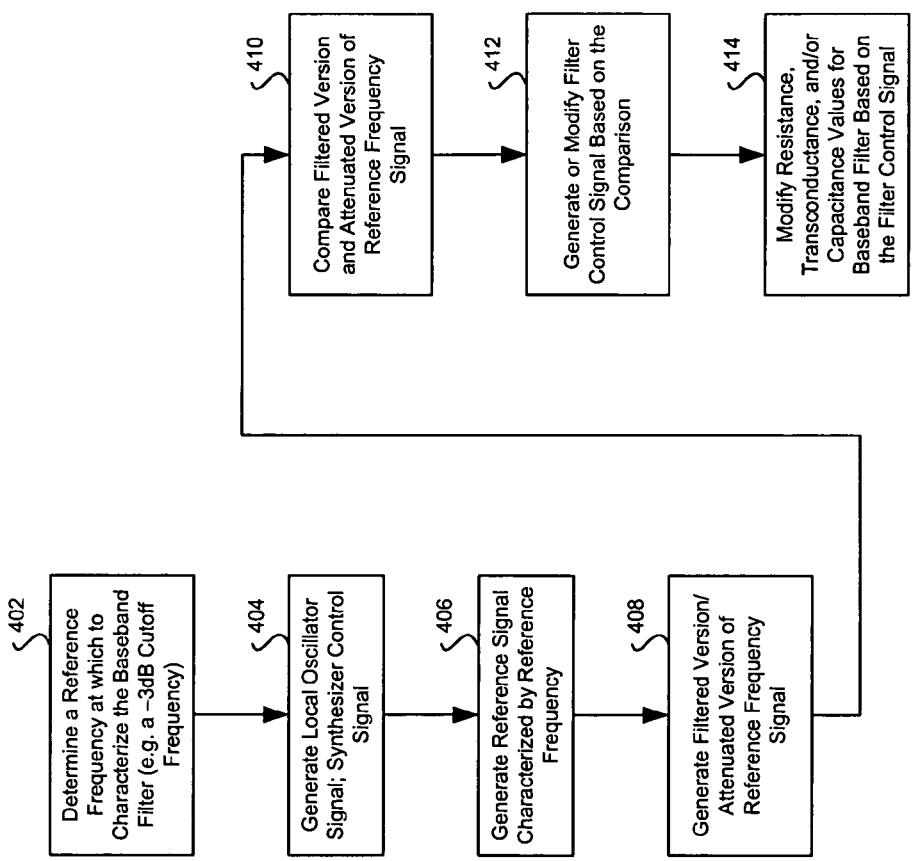
FIG. 4 is a flow diagram illustrating exemplary steps in a filter calibration scheme using fractional-N frequency synthesized signals, in accordance with an embodiment of the invention.

FIG. 4 is a flow diagram illustrating exemplary steps in a filter calibration scheme using fractional-N frequency synthesized signals, in accordance with an embodiment of the invention. Referring to FIG. 4, in step 402 a reference frequency at which to characterize a baseband filter 312c may be determined. The reference frequency may correspond to an expected $f_{-3\,dB}$ cutoff frequency for the baseband filter 312c. In step 404, a local oscillator (LO) signal and synthesizer control signal 338c may be generated. In various embodiments of the invention, the LO signal may be generated by a Σ-Δ fractional-N synthesizer 174, and the synthesizer control signal 338c may be generated by the control logic block 334c.

In step 406, a reference signal may be generated. The reference signal may be characterized by the reference frequency, $f_{-3\,dB}$. In various embodiments of the invention, the reference signal may be generated by the digital frequency synthesizer 188. The digital frequency synthesizer 188 may generate the reference signal based on the LO signal and the synthesizer control signal 338c.

In step 408, a filtered version of the reference frequency signal and an attenuated version of the reference frequency signal may be generated. In various embodiments of the invention, the filtered version of the reference frequency signal may be generated by applying the filtering characteristics of the baseband filter 312c to the reference frequency signal, while the attenuated version of the reference frequency signal may be generated based on the reference frequency signal by the amplifier 324c.

In step 410, the filtered version of the reference frequency signal and the attenuated version of the reference frequency signal may be compared by the comparator 330c. The comparison may be based on an amplitude and/or phase of the filtered version of the reference frequency signal versus the corresponding amplitude and/or phase of the attenuated version of the reference frequency signal. Prior to comparing, the respective signals may be averaged.

In step 412, a filter control signal 336c may be generated and/or modified based on the comparison from step 410. In various embodiments of the invention, the filter control signal may be generated and/or modified by the control logic block 334c.

In step 414, a resistance, transconductance, and/or capacitance value may be modified for a baseband filter 312c based on the filter control signal 336c generated and/or modified in step 412. In various embodiments of the invention that comprise an RC filter, a resistance and/or capacitance value may be modified based on the filter control signal 336c. In various embodiments of the invention that comprise a $G_mC$ filter, a transconductance and/or capacitance value may be modified based on the filter control signal 336c.

Aspects of a system for filter calibration using fractional-N synthesized signals may include a single-chip multi-band RF receiver 140a that enables generation of a LO signal by a PLL circuit within the single-chip, and enables calibration of a frequency response for a filter circuit integrated within the chip. The frequency response may include a filter cut-off frequency and/or a filter phase shift. The filter cut-off frequency may represent a frequency beyond which the filter circuit may attenuate signal amplitudes by at least 3 dB, for example. The filter phase shift may represent a phase shift induced in signals that are processed by the filter circuit. A reference signal may be generated based on the generated LO signal and a synthesizer control signal. The frequency response may be calibrated by adjusting the filter circuit based on the generated reference signal. For an RC filter, exemplary parameters may comprise resistance values and/or capacitance values. For a $G_mC$ filter, exemplary parameters may comprise transconductance values and/or capacitance values. In various embodiments of the invention, the function of the PLL may be implemented by a Σ-Δ fractional-N synthesizer 174. The function of the filter circuit may be implemented by a baseband filter 312c.

The single-chip multi-band RF receiver 140a may enable generation of a reference signal based on the generated LO signal and on a synthesizer control signal. The reference signal may be generated by the digital frequency synthesizer 188. The synthesizer control signal may be generated by a control logic block 334c. The single-chip multi-band RF receiver 140a may also enable generation of an attenuated reference signal by attenuating the reference signal. The reference signal may be attenuated by the amplifier 324c. The single-chip multi-band RF receiver 140a may enable generation of a filtered reference signal based on filtering of the reference signal by the filter circuit. The single-chip multi-band RF receiver 140a may enable comparison of the attenuated reference signal and the filtered reference signal. The comparison may be performed by the comparator 330c.

The single-chip multi-band RF receiver 140a may also enable computation of averages for the attenuated reference signal and for the filtered reference signal, prior to performing the comparison. Each average may be computed by an rms block 326c. The single-chip multi-band RF receiver 140a may enable generation of one or more filter control signals based on the comparison. The control logic block 334c may enable generation of the filter control signals 336c.

The single-chip multi-band RF receiver 140a may enable adjustment of a resistance value, and/or a capacitance value, for the filter circuit integrated within the single chip based on the generated one or more control signals. The single-chip multi-band RF receiver 140a may enable modification of a cut-off frequency for the filter circuit integrated within the chip based on the adjusting of the resistance value, and/or the capacitance value.

The single-chip multi-band RF receiver 140a may enable adjustment of a transconductance value, and/or a capacitance value, for the filter circuit integrated within the chip based on the generated one or more control signals. The single-chip multi-band RF receiver 140a may enable modification of a cut-off frequency for the filter circuit integrated within the chip based on the adjusting of the transconductance value, and/or the capacitance value.

The filter circuit integrated within the single-chip multi-band RF receiver 140a may comprise a low-pass filter. An exemplary low pass filter may comprise a Chebychev filter.

Accordingly, aspects of the invention may be realized in hardware, software, firmware and/or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing information in a wireless communication system, the method comprising:
    generating a local oscillator (LO) signal by utilizing a $\Sigma$-$\Delta$ fractional-N synthesizer circuit within a single-chip multi-band RF receiver;
    generating a reference signal, based on said generated LO signal and a synthesizer control signal, by utilizing a digital frequency synthesizer circuit within said single-chip multi-band RF receiver; and
    calibrating a frequency response for a filter circuit integrated within said single-chip multi-band RF receiver, by adjusting said filter circuit based on said generated reference signal.

2. The method according to claim 1, comprising generating, within said single-chip multi-band RF receiver, an attenuated reference signal by attenuating said reference signal.

3. The method according to claim 2, comprising generating, within said single-chip multi-band RF receiver, a filtered reference signal based on filtering of said reference signal by said filter circuit.

4. The method according to claim 3, comprising comparing, within said single-chip multi-band RF receiver, said attenuated reference signal and said filtered reference signal.

5. The method according to claim 4, comprising computing, within said single-chip multi-band RF receiver, an average for each of: said attenuated reference signal and said filtered reference signal, prior to said comparing.

6. The method according to claim 4, comprising generating at least one filter control signal based on said comparison.

7. The method according to claim 6, comprising adjusting, within said single-chip multi-band RF receiver, at least one of: a resistance value, and a capacitance value, for said filter circuit integrated within said single-chip multi-band RF receiver, based on said generated at least one filter control signal.

8. The method according to claim 7, comprising modifying a cut-off frequency for said filter circuit integrated within said single-chip multi-band RF receiver based on said adjusting said at least one of: said resistance value, and said capacitance value.

9. The method according to claim 6, comprising adjusting at least one of: a transconductance value, and a capacitance value, for said filter circuit integrated within said single-chip multi-band RF receiver based on said generated at least one filter control signal.

10. The method according to claim 9, comprising modifying a cut-off frequency for said filter circuit integrated within said single-chip multi-band RF receiver based on said adjusting said at least one of: said transconductance value, and said capacitance value.

11. The method according to claim 1, wherein said filter circuit integrated within said single-chip multi-band RF receiver comprises a low-pass filter.

12. The method according to claim 11, wherein said low-pass filter comprises a Chebyschev filter.

13. A system for processing information in a wireless communication system, the system comprising:
    a single-chip multi-band RF receiver that enables generation of a local oscillator (LO) signal by utilizing a $\Sigma$-$\Delta$ fractional-N synthesizer circuit within said single-chip multi-band RF receiver;
    said single-chip multi-band RF receiver enables generation of a reference signal, based on said generated LO signal and a synthesizer control signal, by utilizing a digital frequency synthesizer circuit within said single-chip multi-band RF receiver; and
    said single-chip multi-band RF receiver enables calibration of a frequency response for a filter circuit integrated within said single-chip multi-band RF receiver, by adjusting said filter circuit based on said reference signal.

14. The system according to claim 13, wherein said single-chip multi-band RF receiver enables generation of an attenuated reference signal by attenuating said reference signal.

15. The system according to claim 14, wherein said single-chip multi-band RF receiver enables generation of a filtered reference signal based on filtering of said reference signal by said filter circuit.

16. The system according to claim 15, wherein said single-chip multi-band RF receiver enables comparison of said attenuated reference signal and said filtered reference signal.

17. The system according to claim 16, wherein said single-chip multi-band RF receiver enables computation of an average for each of: said attenuated reference signal and said filtered reference signal, prior to said comparison.

18. The system according to claim 16, wherein said single-chip multi-band RF receiver enables generation of at least one filter control signal based on said comparison.

19. The system according to claim 18, wherein said single-chip multi-band RF receiver enables adjustment of at least one of: a resistance value, and a capacitance value, for said filter circuit integrated within said single-chip multi-band RF receiver based on said generation of at least one filter control signal.

20. The system according to claim 19, wherein said single-chip multi-band RF receiver enables modification of a cut-off frequency for said filter circuit integrated within said single-chip multi-band RF receiver based on said adjustment of said at least one of: said resistance value, and said capacitance value.

21. The system according to claim 18, wherein said single-chip multi-band RF receiver enables adjustment of at least one of: a transconductance value, and a capacitance value, for said filter circuit integrated within said single-chip multi-band RF receiver based on said generation of at least one filter control signal.

22. The system according to claim 21, wherein said single-chip multi-band RF receiver enables modification of a cut-off frequency for said filter circuit integrated within said single-chip multi-band RF receiver based on said adjustment of said at least one of: said transconductance value, and said capacitance value.

23. The system according to claim 13, wherein said filter circuit integrated within said single-chip multi-band RF receiver comprises a low-pass filter.

24. The system according to claim 23, wherein said low-pass filter comprises a Chebyschev filter.

* * * * *